United States Patent [19]

Lindsey, Jr.

[11] Patent Number: 4,588,147
[45] Date of Patent: May 13, 1986

[54] METHOD AND APPARATUS FOR SECURING PAYLOADS TO THE EXTERIOR OF AN AIRCRAFT

[75] Inventor: Thomas J. Lindsey, Jr., Marietta, Ga.

[73] Assignee: Lockheed Corporation, Burbank, Calif.

[21] Appl. No.: 619,111

[22] Filed: Jun. 11, 1984

[51] Int. Cl.$^4$ .............................. B64C 7/00; B64C 1/14
[52] U.S. Cl. .............................. 244/118.1; 244/137 A; 244/129.4; 343/705
[58] Field of Search .............. 244/118.1, 118.5, 118.6, 244/137 R, 137 A; 89/1.59, 1.58, 1.54, 37.5 R; 343/705

[56] References Cited

U.S. PATENT DOCUMENTS

| | | | |
|---|---|---|---|
| 2,921,501 | 1/1960 | Parot | 244/137 R |
| 3,823,901 | 7/1974 | Holmes et al. | 244/118.1 |
| 4,154,416 | 5/1979 | Bruce et al. | 244/118.6 |

*Primary Examiner*—Galen L. Barefoot
*Attorney, Agent, or Firm*—Eric R. Katz

[57] ABSTRACT

A method and apparatus for providing heavy structural attachment points outside the pressure vessel of an aircraft is described which requires no special modification to the aircraft itself, while at the same time, maintains aircraft pressurization. The method comprises the installation of the apparatus which comprises a removable pressure plug, and a load-bearing structural support. The pressure plug is adapted to replace an existing plug in the fuselage of the aircraft and provides for penetration of the support as well as a seal for pressurization loads. The support attaches to suitable structural attachment points within the fuselage and the external, functional payload attaches to the support.

8 Claims, 5 Drawing Figures

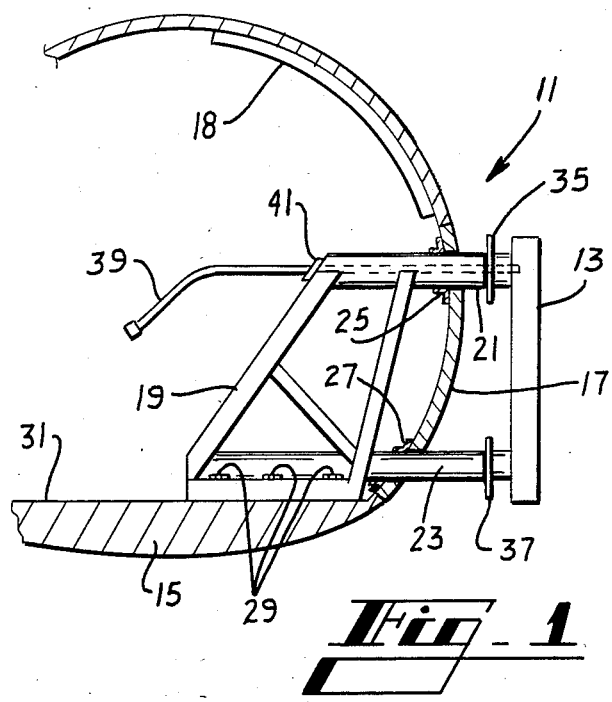
Fig_1
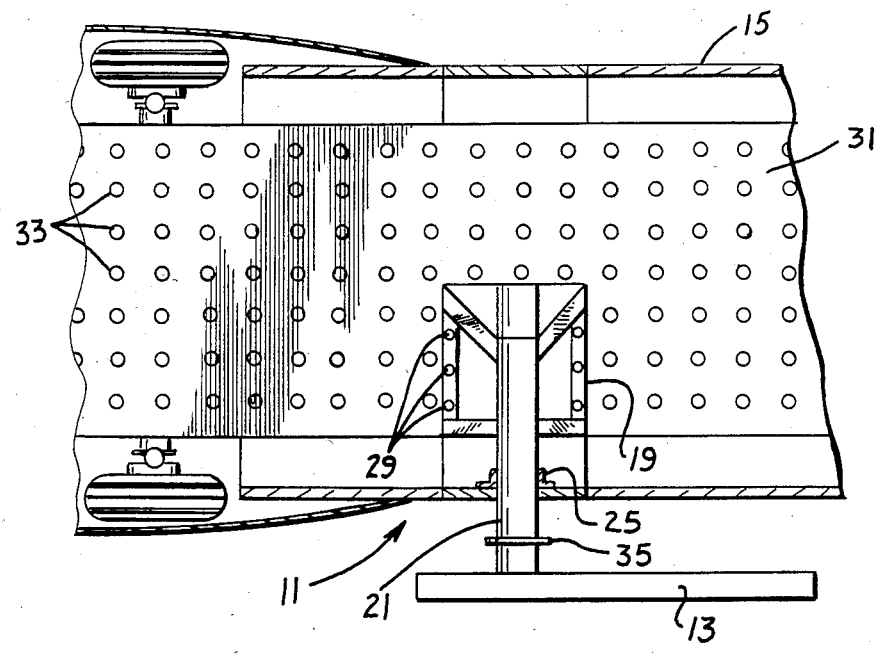
Fig_2

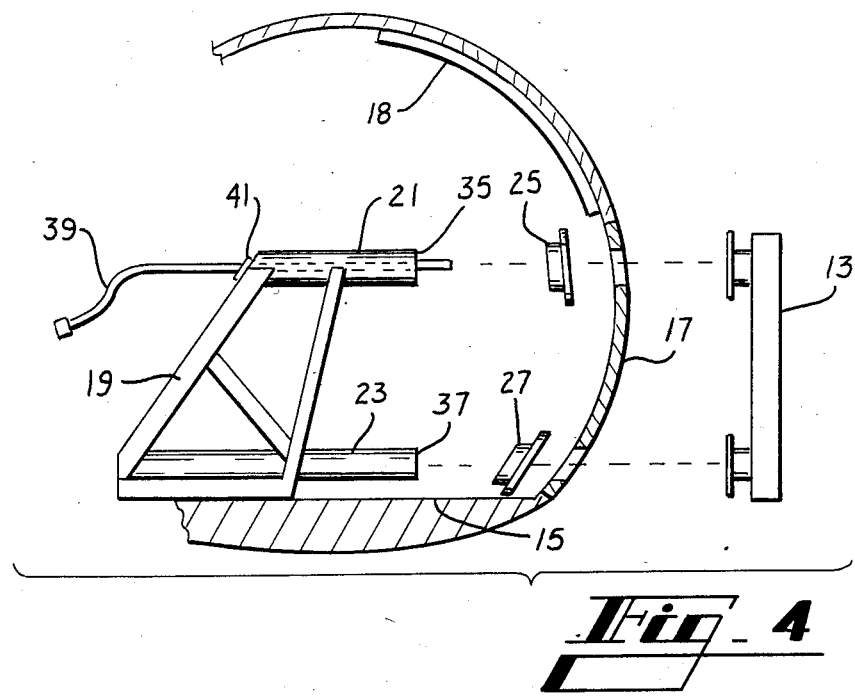
Fig_4
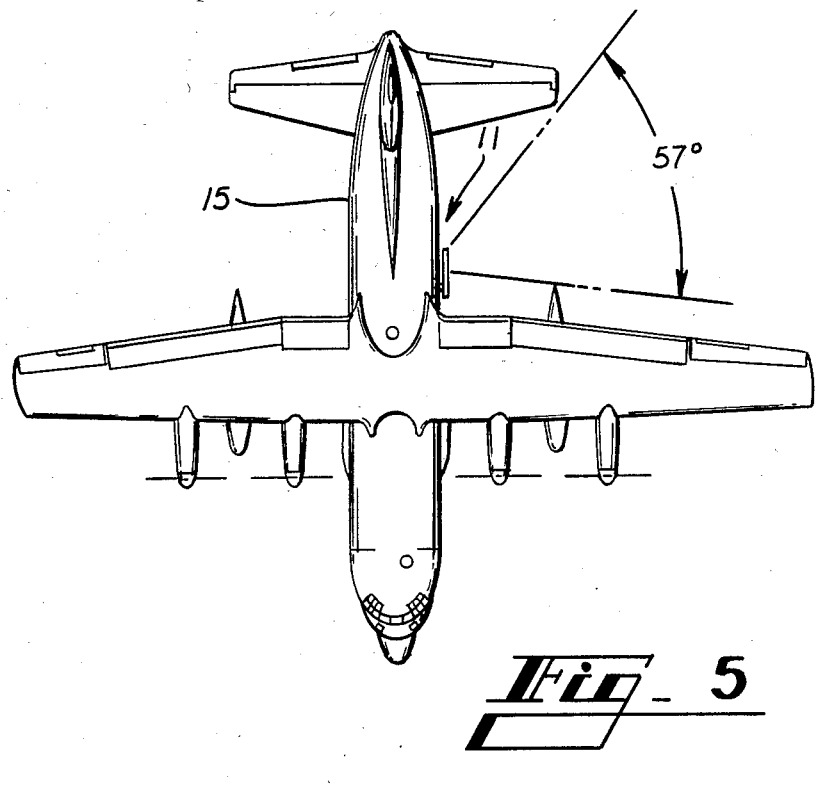
Fig_5

METHOD AND APPARATUS FOR SECURING PAYLOADS TO THE EXTERIOR OF AN AIRCRAFT

TECHNICAL FIELD

The present invention generally relates to a method and apparatus for providing heavy structural attachment points outside the pressure vessel of an aircraft and more particularly, to a method and apparatus for securing miscellaneous functional payloads to the exterior of the aircraft without the need to modify the aircraft, while at the same time, maintaining aircraft pressurization.

BACKGROUND ART

Typically, the attachment of such miscellaneous function payloads as, for example, antenna arrays, guidance systems, rocket pods, and the like, to the exterior of an aircraft, it is accomplished by means of structural and functional provisions incorporated into the original design of the aircraft or via subsequent structural modifications to a completed aircraft. Such external attachment arrangements create special problems in the design and construction of the fuselage adjacent the external attachment points in that the payload must be properly supported so as to withstand its own weight as well as airloads and winds to which it may be subjected during the operation of the aircraft.

When greater performance is required of the aircraft, as is presently the case, and an external payload is included, those above-noted considerations become compounded. External payloads make it necessary to reinforce the adjacent stationary structure to assure its integrity during flight, and hence add weight to the aircraft. Moreover, designing-in such provisions, or adding them on through modifications, limits payloads to only those which are compatible with the original design limitations while imposing on-going weight and aerodynamic drag penalties even when the external payload is not in use.

In addition to the aforementioned considerations, pressurization of the aircraft interior, during high altitude flights, presents further difficulties due to leakage through structural and functional load paths which pass through the pressure vessel of the aircraft fuselage.

DISCLOSURE OF THE INVENTION

The present invention recognizes the above and other problems in the attachment of external functional payloads and proposes a unique solution through the use of an uncomplicated, and yet efficient, method and apparatus for securing payloads to the exterior of the aircraft without the need to modify the aircraft.

Additionally, the present invention provides for rapid conversion of a basic, undedicated aircraft to a variety of special mission configurations requiring external passive or functional payloads while maintaining aircraft pressurization.

Moreover, the present invention provides for the rapid installation and removal of the external payload when and as needed.

In accordance with the present invention there is provided an apparatus for securing a payload to the exterior of an aircraft comprising a removable pressure plug and a load-bearing, structural support. The pressure plug is adapted to replace an existing pressure plug, for example, a paratroop door in the fuselage of an aircraft. The load-bearing, structural support extends through the pressure plug which provides a seal for pressurization loads resulting from the pressurization of the interior of the aircraft during high altitude flight. The load-bearing, structural support is adapted for attachment within the fuselage, such as, for example, to existing tiedown rings on the floor of a cargo aircraft. Thus, by replacing the existing pressure plug with a modified pressure plug and load-bearing structural support assembly, it is possible to rapidly install an external payload to the fuselage of the aircraft without the need for modification thereto.

In accordance with the present invention, there is also provided a method for securing a functional payload to the exterior of an aircraft having an existing pressure plug in the fuselage, the method comprising the steps of removing the existing pressure plug in the fuselage to provide an aperture through the pressure vessel of the aircraft and thereafter replacing the existing pressure plug with a modified pressure plug and load-bearing structural support assembly. The load-bearing structural support is then securely anchored to existing tiedown rings on the aircraft cargo floor and the payload installed on external attachment points on the load-bearing structural support.

BRIEF DESCRIPTION OF THE DRAWINGS

FIG. 1 is a side, planar, sectional view of the apparatus of the present invention installed in an undedicated aircraft fuselage;

FIG. 2 is a top, planar, sectional view of the apparatus of the present invention illustrating the tie-down configuration for the load-bearing structural support of invention;

FIG. 4 is an exploded view illustrating the method and apparatus of the present invention; and FIG. 5 is a top, planar view of an aircraft illustrating the unobstructed field-of-view of a planar array antenna installed in accordance with the present invention.

BEST MODE FOR CARRYING OUT THE INVENTION

Figure 3:
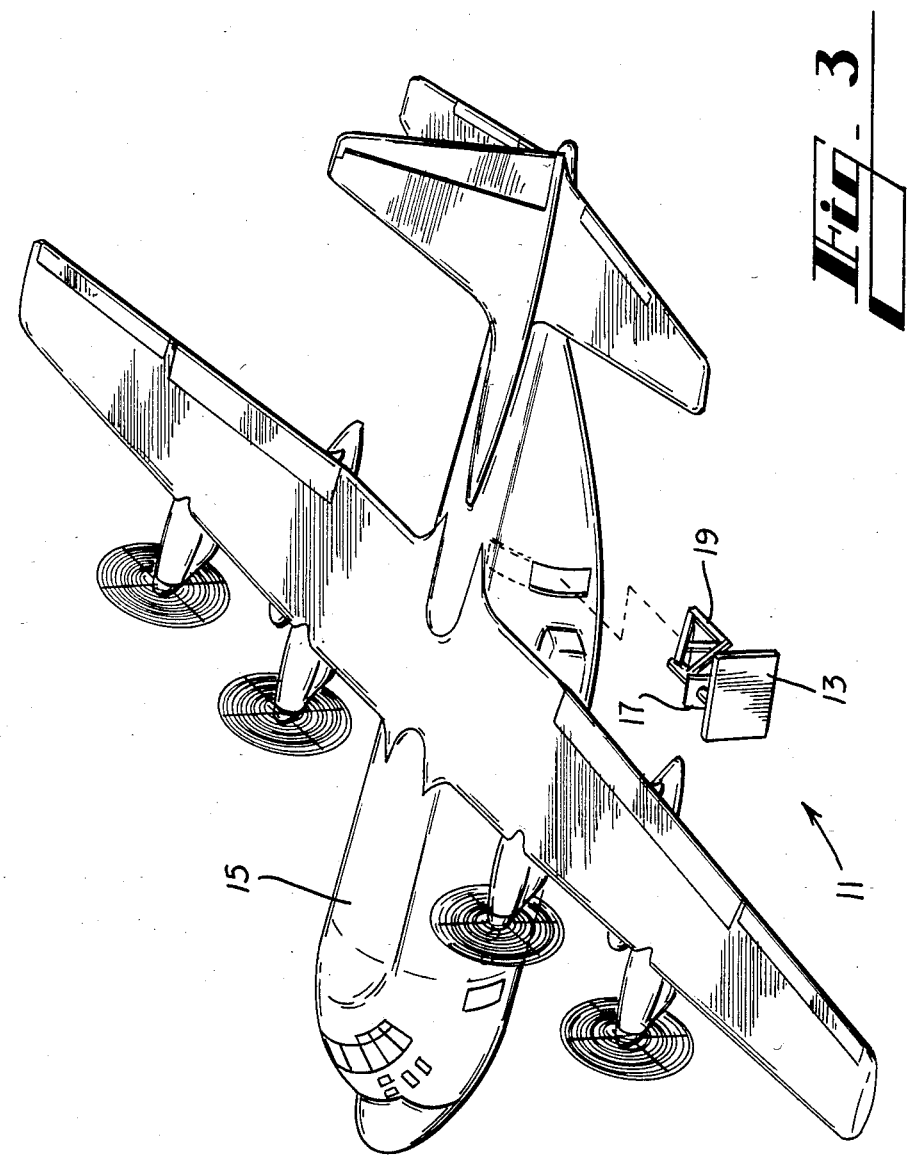
FIG. 3 is a perspective view of an undedicated aircraft illustrating the method of the present invention.

The present invention relates to a method and apparatus for providing structural attachment points for supporting heavy loads outside the pressure vessel of an aircraft. The invention furnishes a structural and functional load path that passes through the pressure vessel of the aircraft fuselage, this being accomplished without any modification to the aircraft.

The method includes installation of the apparatus which comprises a removable pressure plug and a load-bearing, structural support. The pressure plug is designed to replace an existing pressure plug in the fuselage of the aircraft and provides for the penetration of the structural support. Additionally, the pressure plug provides a seal for pressurization loads when the interior of the fuselage is pressurized during high altitude flight. The loadbearing, structural support attaches to suitable structural attachment points within the fuselage to provide a structural load path from within the pressure vessel to the unpressurized exterior of the fuselage where miscellaneous functional payloads can be securely attached. The invention will be more apparent from the following more particular description of the preferred embodiments of the invention as illustrated in the accompanying drawings.

FIGS. 1 and 2 illustrate the apparatus of the present invention, generally indicated at 11, configured to accommodate the rapid installation and removal of an external payload 13 on the side of an undedicated cargo aircraft 15. In the particular embodiment of the invention illustrated herein, the payload 13, by way of example only, is shown as a large planar array antenna for a telemetry system; however, other external payloads can be accommodated such as missiles, tanks, pods, rockets, control mechanisms, and the like.

The apparatus 11 comprises a pressure plug 17 and a load-bearing, structural support 19. The pressure plug 17 is a specially modified closure adapted to seal an existing opening in the fuselage of the aircraft 15. The pressure plug 17 is placed in the opening and latched into place using the existing latch mechanism normally used for closing the opening. In the embodiment illustrated herein, the opening is provided by a paratroop door 18 which is routinely raised and locked into its normal open position.

The load-bearing, structural support 19 has a pair of support arms 21 and 23 which pass through flexible pressure seals 25 and 27, respectively, built into the pressure plug 17. In the embodiment illustrated, the seals 25, 27 comprise flap seals, however, any other seal arrangement can be employed providing the passage of the arms 21, 23 is permitted and a seal established.

Tiedowns 29 are provided along the base of the load-bearing, structural support 19 for securely anchoring the support 19 to aircraft cargo floor 31 by means of attachment to existing cargo floor tiedown rings 33.

The payload 13 is installed on external attachment points 35 and 37 adapted for attachment to complementary fittings on the payload 13. Functional controls for the payload 13 are provided by functional control connection means such as electrical, hydraulic, mechanical pushrods, cables, or the like 39 passing through the support 19. Pressure seals 41, in combination with pressure seals 25, 27, maintain the aircraft cabin pressurization during use of the described apparatus 11.

The method of the present invention will now be described with particular reference to FIGS. 1-4. Initially, the paratroop door 18 is routinely raised an locked into place as shown in FIG. 1. Thereafter, a specially modified paratroop door, which serves as the apparatus pressure plug 17, is hand carried into the aircraft 15, placed into the opening left by the paratroop door 18, and latched into place using the standard existing latch mechanism normally used for closing the onboard, paratroop door 18.

Once the pressure plug 17 is in place, the load-bearing, structural support 19 is placed in position with its support arms 21, 23 passing through the flexible seals 25, 27, respectively, built into the pressure plug 17. The support 19 is then securely anchored to the aircraft cargo floor 31 by means of attachment to several of the existing cargo floor tiedown rings 33. Thereafter, the payload 13 is installed on the external attachment points 35, 37.

Once use of the payload is completed, removal of the apparatus 11 is accomplished by reversing the above-noted procedure, thus returning the aircraft 15 to its original, undedicated configuration. In addition to the paratroop door 18, other existing, removable pressure plugs in the aircraft 15, such as the emergency escape hatches, swing-open windshield panels, and the like, are candidates for application of this concept. Additionally, while a two arm embodiment of the invention is illustrated, it should be noted that a three, four, or more support arm configuration is also contemplated.

Referring to FIG. 5, if a telemetry planar array antenna system is installed as the external payload 13 and such installation is positioned at paratroop door 18, an unobstructed field-of-view is provided having an arc of approximately 57°.

While the invention has been particularly shown and described with reference to preferred embodiments thereof, it will be understood by those skilled in the art, that various changes in form and detail may be made therein without departing from the spirit and scope of the appended claims.

I claim:

1. An apparatus for securing a payload, the operation of which is controlled from the interior of an aircraft, to the exterior of the aircraft having an existing, removable pressure plug in the fuselage of the aircraft and a floor with tiedown rings adjacent the plug, said apparatus comprising:
    (a) a modified pressure plug for replacing the existing, removable pressure plug in the fuselage of the aircraft, said modified pressure plug having at least one aperture therethrough;
    (b) a load-bearing, structural support having at least one support arm adapted to extend through the aperture of said modified pressure plug and a base adapted for attachment to the cargo floor, tiedown rings;
    (c) a seal for sealing the aperture of said modified pressure plug when said support arm extends therethrough so as to provide a seal for pressurization loads resulting from the pressurization of the interior of the aircraft;
    (d) an attachment point on said support arm adapted for attaching the payload to said support arm;
    (e) a functional control connection means for connecting the external payload to the interior of the aircraft to facilitate the operation of the payload from the interior of the aircraft, said functional control connection means passing through said at least one support arm of said load-bearing, structural support.

2. An apparatus according to claim 1, wherein said modified pressure plug is adapted to replace a paratroop door.

3. An apparatus according to claim 2, wherein said seal is a flap seal.

4. An apparatus according to claim 3, wherein the floor of the aircraft is a cargo floor.

5. An apparatus according to claim 4, wherein said load-bearing, structural support has more than one support arm and said modified pressure plug has a corresponding number of apertures through which said arms are adapted to extend.

6. An apparatus according to claim 5, wherein the external payload is an antenna.

7. A method for securing a payload to the exterior of an aircraft having an existing, removable pressure plug in the fuselage of the aircraft and a floor with tiedown members adjacent the pressure plug, said method comprising the steps of:
    (a) opening the existing, removable pressure plug to provide an opening;

(b) placing a modified pressure plug adapted to replace the existing, removable pressure plug in the opening:
(c) latching the modified pressure plug into place using the standard existing latch mechanism normally used for closing the existing, removable pressure plug;
(d) positioning a load-bearing, structural support having a support arm within the fuselage so that the support arm passes through flexible pressure seals built into the modified pressure plug; and
(e) anchoring the load-bearing, structural support to the floor by means of attachment to several of the existing tiedown members.

8. A method according to claim 7, further comprising the step of:
the payload on external attachment points on the end of the support arm.

* * * * *